United States Patent
Koshino et al.

[11] Patent Number: 5,822,367
[45] Date of Patent: Oct. 13, 1998

[54] DIGITAL MOBILE DATA COMMUNICATION SYSTEM

[75] Inventors: Katuhide Koshino; Masayuki Sakata, both of Tokyo, Japan

[73] Assignee: NEC Corporation, Tokyo, Japan

[21] Appl. No.: 701,399

[22] Filed: Aug. 22, 1996

[30] Foreign Application Priority Data

Aug. 31, 1995 [JP] Japan ................................. 7-224220

[51] Int. Cl.⁶ ........................................................ H04L 5/16
[52] U.S. Cl. ......................... 375/222; 375/243; 375/220; 371/32; 371/35
[58] Field of Search ................................. 375/219, 222, 375/243, 356, 220; 371/2.1, 5.4, 5.5, 30, 32, 33, 35; 455/3.2, 39, 73, 74.1, 91, 95, 130, 133

[56] References Cited

U.S. PATENT DOCUMENTS

| | | | |
|---|---|---|---|
| 5,524,122 | 6/1996 | Lepitre et al. | 375/222 |
| 5,526,399 | 6/1996 | Kameda | 455/74.1 |
| 5,640,673 | 6/1997 | Tanabe | 371/33 |
| 5,694,391 | 12/1997 | Diachina et al. | 371/32 |
| 5,696,766 | 12/1997 | Yeung et al. | 375/356 |

Primary Examiner—Wellington Chin
Assistant Examiner—Congvan Tran
Attorney, Agent, or Firm—Young & Thompson

[57] ABSTRACT

A digital mobile data communication system includes a protocol converter in an exchange which simultaneously activates an FEC protocol receiver in a radio communication zone for modem communications at a rate of 2.4 Kbps and an ARQ protocol receiver in the radio communication zone for modem communications at a rate of 9.6 Kbps, and selects whichever one of the FEC protocol receiver or ARQ protocol receiver that has established receiving synchronization and the corresponding protocol transmitter.

3 Claims, 5 Drawing Sheets

DIGITAL MOBILE DATA COMMUNICATION SYSTEM

BACKGROUND OF THE INVENTION

1. Field of the Invention:

The present invention relates to a digital mobile data communication system, and more particularly to mobile data communications recommended by RCR STD-27C (standards established by Research & Development Center for Radio Systems).

2. Description of the Related Art:

Heretofore, non-voice services available for digital mobile telephone include V.42ANNEX modem communication services and G3 facsimile (FAX) communication services.

FIG. 1(a) of the accompanying drawings shows a system for V.42ANNEX modem communication services. In this system, according to the recommendations of RCR STD-27C, the V.42ANNEX protocol between a modem 102 and a protocol converter in an exchange 106 and also between a modem 108 and a protocol converter in a mobile station 107 is converted into the FEC (Forward Error Correction) protocol in a radio communication zone including the protocol converter in an exchange 106, an exchange 103, a base station 104, a mobile telephone set 105, and the protocol converter in a mobile station 107, for achieving modem communications at a rate of 2.4 Kbps between a personal computer (PC) 101 connected to a PSTN (Public Switched Telephone Network) and a mobile personal computer (PC) 109. The mobile telephone set 105, the protocol converter in a mobile station 107, the modem 108, and the personal computer (PC) 109 jointly make up a mobile system. The mobile telephone set 105 is a digital portable telephone set. Each of the personal computers (PC) 101, 109 may be another data terminal such as DTE (Data Terminal Equipment).

In this configuration, at the time of starting a session of data communications, the exchange 103 activates the protocol converter in the exchange 106 for data communication service class information (modem communication service request) requested by the mobile telephone set 105. FEC transmitting and receiving synchronization is established between the protocol converter in the exchange 106 and the protocol converter in the mobile station 107. Then, the V.42ANNEX transmitting and receiving protocol is established between the modems 102, 108 and the protocol converters 106, 107, after which data communications are carried out through the modems 102, 108.

FIG. 1(b) of the accompanying drawings shows a system for G3 FAX communication services. In this system, according to the recommendations of RCR STD-27C, the T.4/T.30 protocol between a FAX 112 connected to the PSTN and a protocol converter in an exchange 116 and also between a mobile FAX 118 and a protocol converter in a mobile station 117 is converted into the ARQ (Automatic Repeat Request) protocol in a radio communication zone for accomplishing FAX communications at a rate of 9.6 Kbps between the FAXs 112, 118. Those parts shown in FIG. 1(b) which are identical to those shown in FIG. 1(a) are denoted by identical reference numerals.

According to transmission control procedures for the FAX communications in the system shown in FIG. 1(b), at the time of starting a session of data communications, the exchange 103 activates the protocol converter in the exchange 116 for data communication service class information (FAX communication service request) requested by the mobile telephone set 105. ARQ transmitting and receiving synchronization is established between the protocol converter in the exchange 116 and the protocol converter in the mobile station 117. Then, the T.4/T.30 transmitting and receiving protocol is established between the FAXs 112, 118 and the protocol converters 116, 117, after which data communications are carried out.

In the above conventional modem communications for non-voice services for digital mobile telephone, it has not been possible to carry out communications at rates other than 2.4 Kbps since the FEC protocol is used in the radio communication zone.

When the mobile telephone set sends a data communication request, the data communication service class information which is delivered from the mobile telephone set to the exchange is limited to only class information representing the two classes of FAX and modem, and hence any information regarding a modem communication rate cannot be delivered to the PSTN. In order to newly provide 9.6 Kbps modem communication services, it is necessary to add new class information to the data communication service class information which is delivered from the mobile telephone when a session of data communications is started. For adding such new class information, the mobile telephone set and the exchange need to have their specifications changed.

SUMMARY OF THE INVENTION

It is therefore an object of the present invention to provide a digital mobile data communication system which can provide 9.6 Kbps modem communication services in addition to 2.4 Kbps modem communication services without the need for changes in specifications of mobile telephone sets and an exchange.

According to the present invention, there is provided a digital mobile data communication system comprising a mobile system comprising a digital mobile telephone set and a protocol converter in a mobile station, and a protocol converter in an exchange comprising an FEC protocol receiver and an FEC protocol transmitter in a radio communication zone for modem communications at a rate of 2.4 Kbps, an ARQ protocol receiver and an ARQ protocol transmitter in a radio communication zone for modem communications at a rate of 9.6 Kbps, and means, responsive to a modem communication service request from the mobile system, for simultaneously activating the FEC protocol receiver and the ARQ protocol receiver and selecting whichever one of the FEC protocol receiver or the ARQ protocol receiver that has established receiving synchronization and the corresponding FEC protocol transmitter or ARQ protocol transmitter.

According to the present invention, there is also provided a digital mobile data communication system comprising a data terminal, a modem, and an exchange which are connected to a public network, a mobile system comprising a digital mobile telephone set and a protocol converter in a mobile station, for carrying out modem communications with the data terminal through the modem in a radio communication zone, and a protocol converter in an exchange comprising a V.42ANNEX protocol transmitter, a V.42ANNEX protocol receiver, an FEC protocol transmitter, and an FEC protocol receiver for modem communications at a rate of 2.4 Kbps, a V.32 protocol transmitter, a V.32 protocol receiver, an ARQ protocol transmitter, and an ARQ protocol receiver for modem communications at a rate of 9.6 Kbps, and a protocol conversion controller for receiving a modem activation command from the exchange in response to a modem communication service request from the digital mobile telephone set, wherein when the protocol conversion controller receives the modem communication service request, the protocol conversion controller activates the FEC protocol receiver and the ARQ protocol receiver simultaneously, and wherein when FEC protocol receiving synchronization with the protocol converter in the mobile station is established, the FEC protocol receiver activates the FEC protocol transmitter and the protocol conversion controller deactivates the ARQ protocol receiver, and when ARQ protocol receiving synchronization with the protocol converter in the mobile station is established, the ARQ protocol receiver activates the ARQ protocol transmitter and the protocol conversion controller deactivates the FEC protocol receiver to establish protocol transmitting and receiving synchronization in the radio communication zone, and thereafter protocol transmitting and receiving synchronization in the public network between the V.42ANNEX protocol transmitter and the V.42ANNEX protocol receiver or the V.32 protocol transmitter and the V.32 protocol receiver is established for modem communications.

The above and other objects, features, and advantages of the present invention will become apparent from the following description with reference to the accompanying drawings which illustrate an example of the present invention.

DETAILED DESCRIPTION OF THE PREFERRED EMBODIMENT

Figure 2:
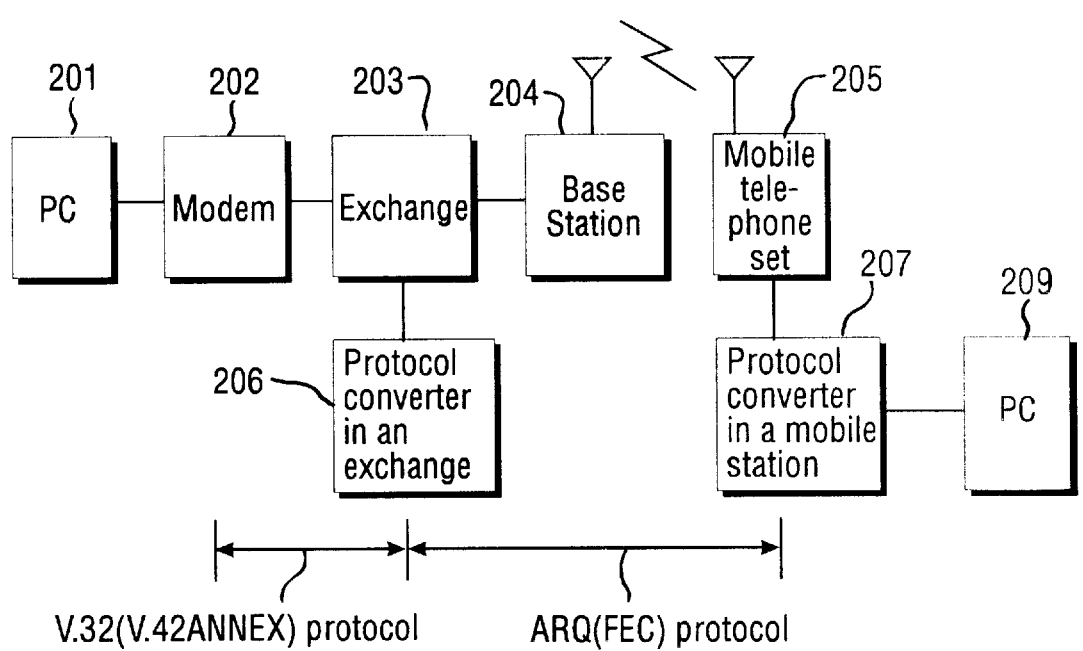
FIG. 2 is a block diagrams of a digital mobile data communication system according to the present invention.

FIG. 2 shows in block form a digital mobile data communication system according to the present invention.

As shown in FIG. 2, in order for the digital mobile data communication system to carry out 9.6 Kbps modem communications, a protocol converter in an exchange 206 converts the V.32 protocol between itself and a modem 202 connected to a personal computer (PC) 201 into the ARQ protocol in a radio communication zone which includes the protocol converter in the exchange 206, an exchange 203, a base station 204, a mobile telephone set 205, and a protocol converter in a mobile station 207.

Figure 1A:
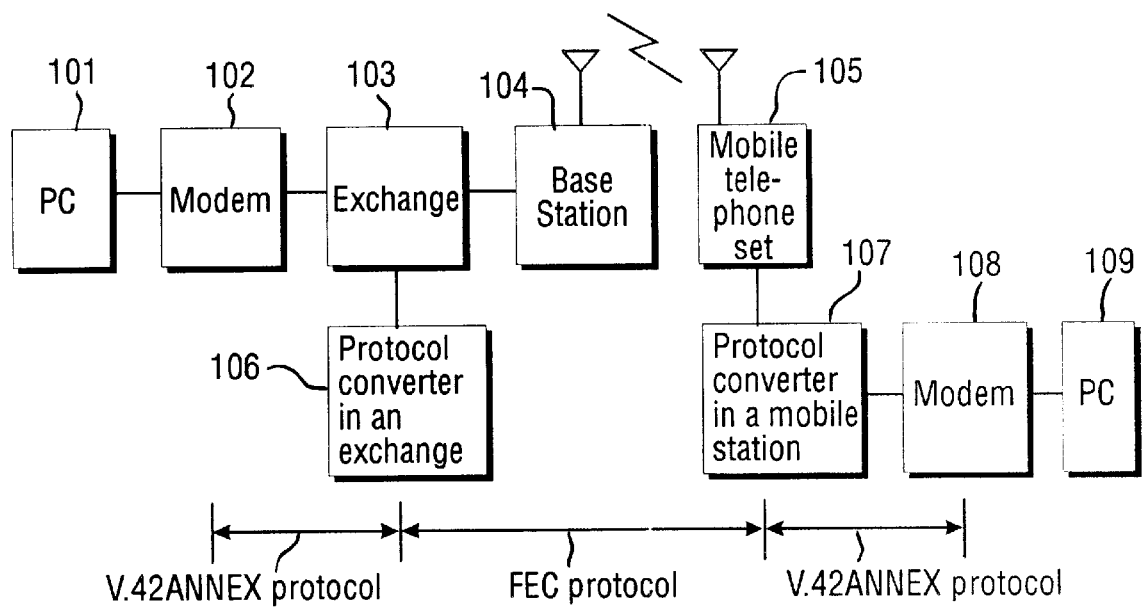
FIGS. 1(a) and 1(b) are block diagrams of conventional digital mobile data communication systems.
Figure 1B:
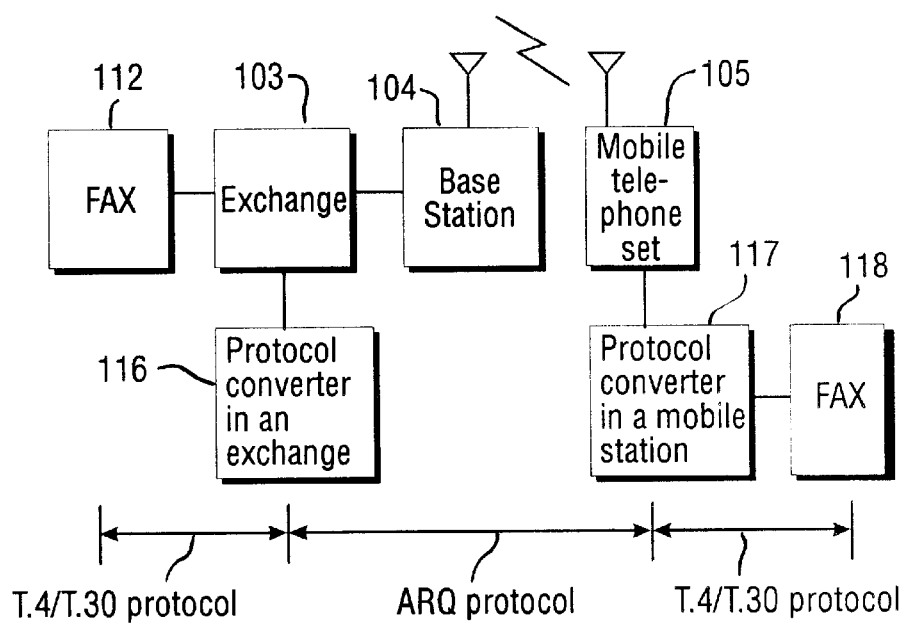

The protocol converter in the mobile station 207 makes a connection to a personal computer (PC) 208 for conversion into the ARQ protocol. Specifically, the protocol converter in the mobile station 207, the mobile telephone set 205, and the personal computer (PC) 208 jointly make up a mobile system. The protocol converter in the mobile station 207 converts the rate of data from the personal computer (PC) 208 into a rate of 9.6 Kbps in the process of ARQ protocol conversion for modem communications at the rate of 9.6 Kbps with a PSTN connected to the personal computer (PC) 201. For modem communications at a rate of 2.4 Kbps, the configurations and protocols of the mobile system and the PSTN are the same as those shown in FIG. 1(a) except for the protocol converter in the exchange as described in detail later on.

Figure 3:
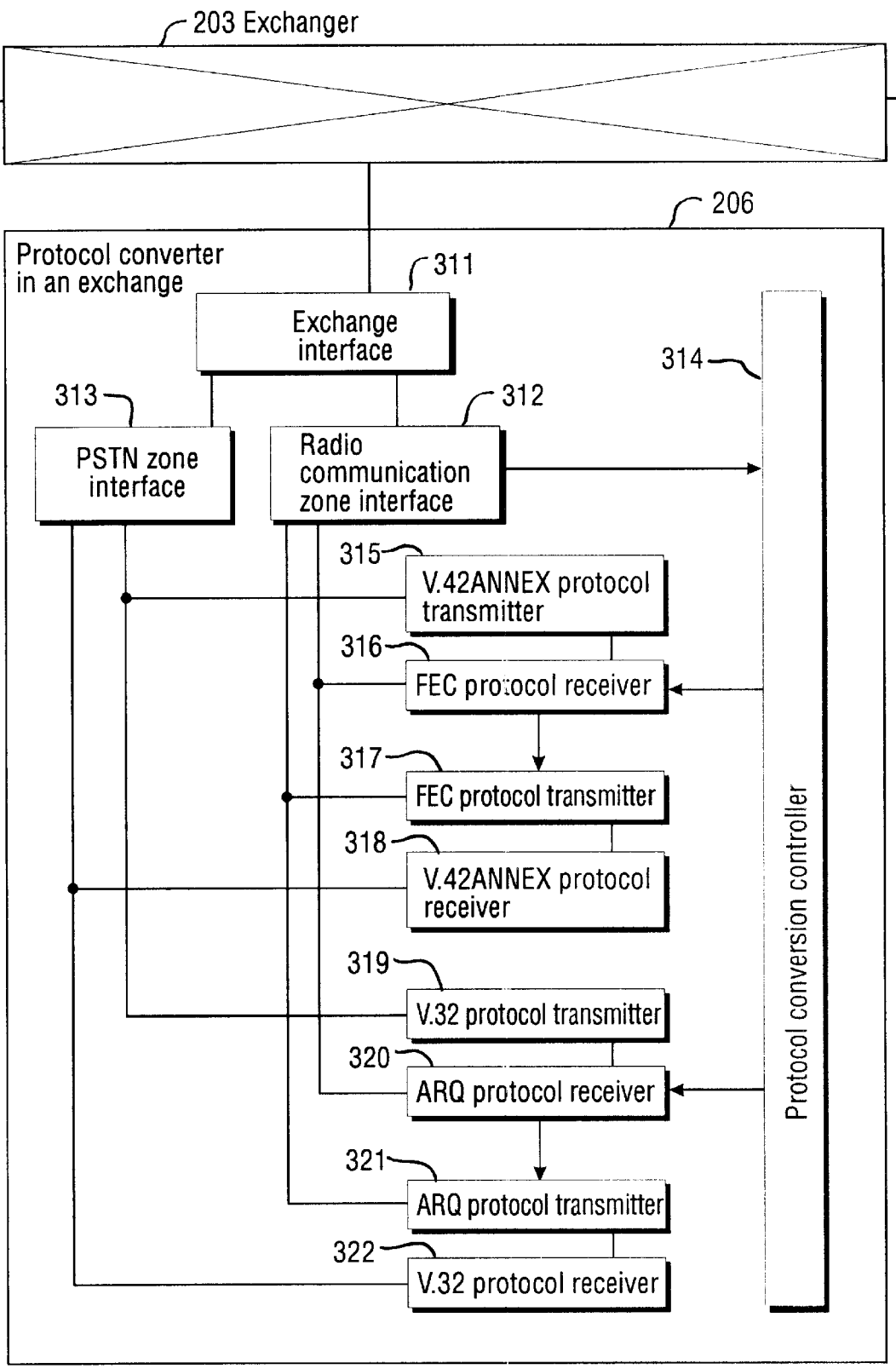
FIG. 3 is a detailed block diagram of a protocol converter in an exchange in the digital mobile data communication system shown in FIG. 2.

As shown in FIG. 3, the protocol converter in an exchange 206 has an exchange interface 311, a PSTN zone interface 313, and a radio communication zone interface 312 for interfacing with the exchange 203, and is capable of data transmission. For achieving the conventional communications at the rate of 2.4 Kbps, the protocol converter in an exchange 206 has a V.42ANNEX protocol transmitter 315, a V.42ANNEX protocol receiver 318, an FEC protocol transmitter 317, and an FEC protocol receiver 316. For newly achieving modem communications at the rate of 9.6 Kbps, the protocol converter in an exchange 206 has a V.32 protocol transmitter 319, a V.32 protocol receiver 322, an ARQ protocol transmitter 321, and an ARQ protocol receiver 320.

A modem activation command from the exchange 203 is given to a protocol conversion controller 314, which activates the FEC protocol receiver 316 and the ARQ protocol receiver 320 simultaneously. If FEC protocol receiving synchronization is established after the FEC protocol receiver 316 and the ARQ protocol receiver 320 has been activated, then the FEC protocol receiver 316 activates the FEC protocol transmitter 317, and the protocol conversion controller 314 deactivates the ARQ protocol receiver 320. If ARQ protocol receiving synchronization is established after the FEC protocol receiver 316 and the ARQ protocol receiver 320 has been activated, then the ARQ protocol receiver 320 activates the ARQ protocol transmitter 321, and the protocol conversion controller 314 deactivates the FEC protocol receiver 316.

Figure 4:
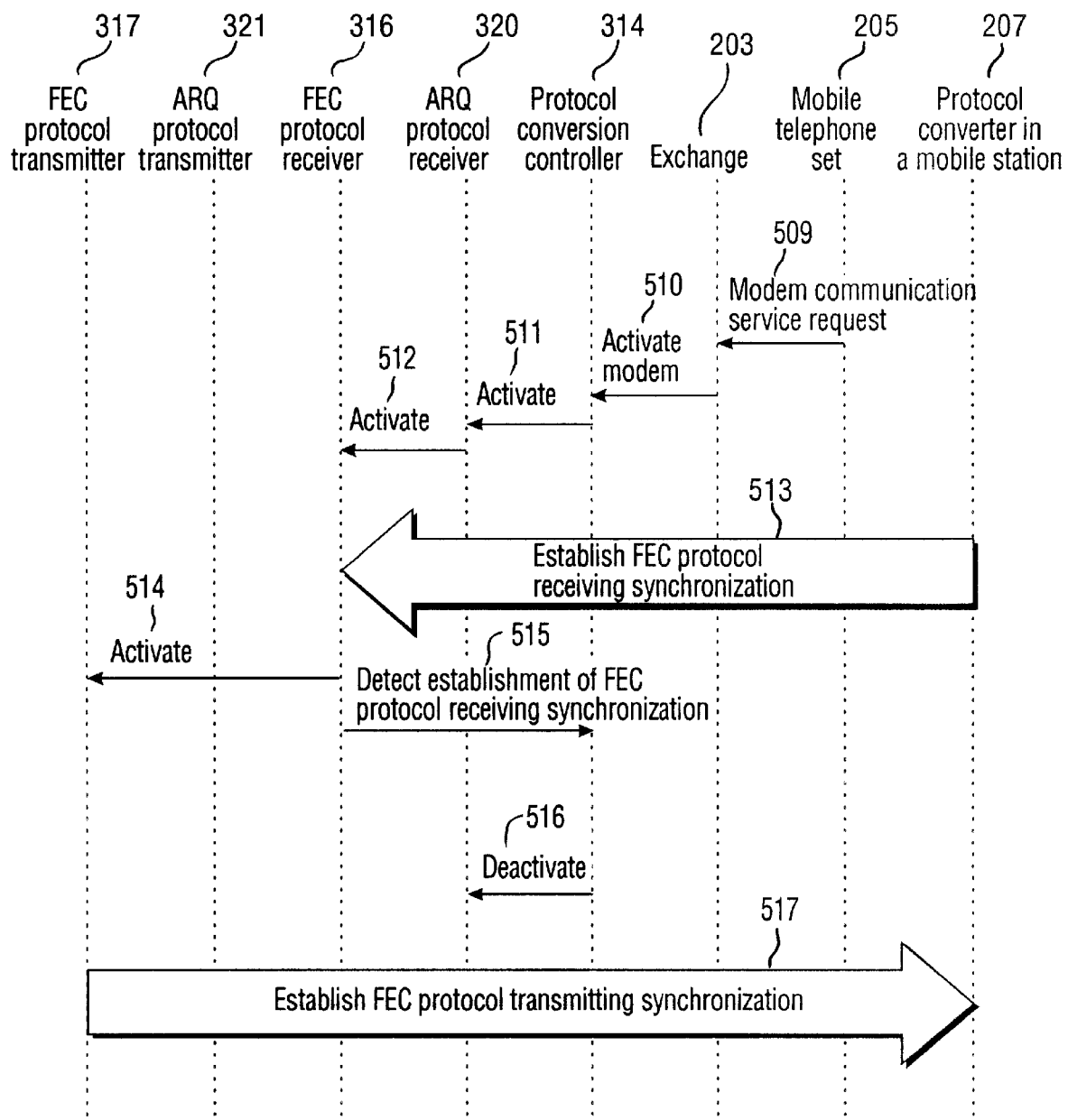
FIG. 4 is a diagram of transmission control procedures of the digital mobile data communication system shown in FIG. 2.

Transmission control procedures in the case where the protocol converter in the mobile station 207 is designed for modem communications at the rate of 2.4 Kbps will be described below with reference to FIG. 4. When a modem communication service request 509 is given by the mobile telephone set 205, the exchange 203 requests the protocol conversion controller 314 to activate the modem 202 at 510. The protocol conversion controller 314 activates the FEC protocol receiver 316 at 512 and activates the ARQ protocol receiver 320 at 511 simultaneously. In communications between the FEC protocol receiver 316 and the protocol converter in the mobile station 207, the transmission of an FEC synchronizing signal from the protocol converter in the mobile station 207 is recognized as the establishment of FEC protocol receiving synchronization at 513 by the FEC protocol receiver 316. Upon establishment of FEC protocol receiving synchronization at 513, the FEC protocol receiver 316 activates the FEC protocol transmitter 317 at 514, and FEC protocol transmitting synchronization is established at 517. When the protocol conversion controller 314 detects the establishment of FEC protocol receiving synchronization at 515, the protocol conversion controller 314 deactivates the ARQ protocol receiver 320 at 516. Now, FEC protocol transmitting and receiving synchronization in the radio communication zone is established.

Figure 5:
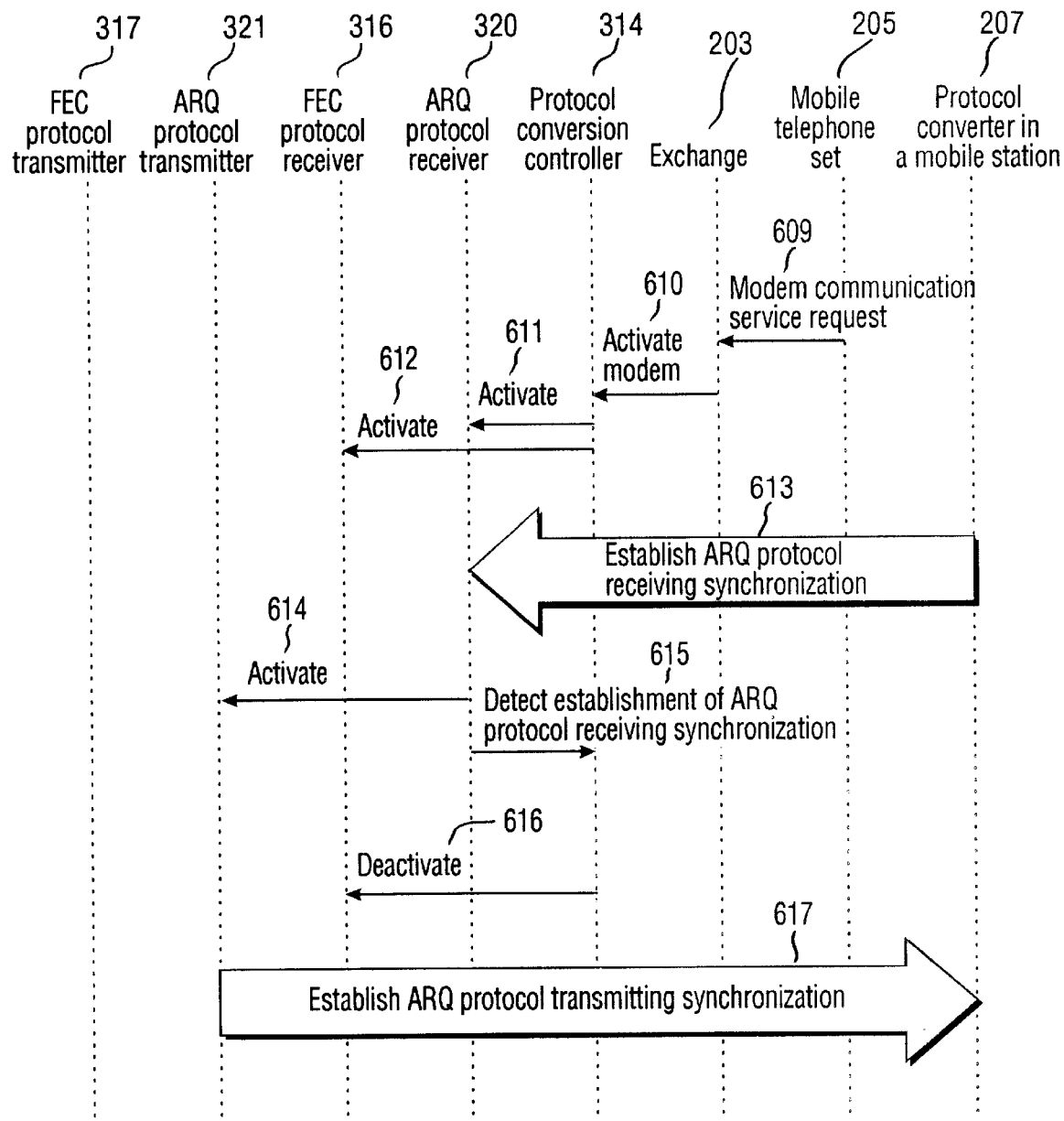
FIG. 5 is a diagram of another set of transmission control procedures of the digital mobile data communication system shown in FIG. 2.

Transmission control procedures in the case where the protocol converter in the mobile station 207 is designed for modem communications at the rate of 9.6 Kbps will be described below with reference to FIG. 5. When a modem communication service request 609 is given by the mobile telephone set 205, the exchange 203 requests the protocol conversion controller 314 to activate the modem 202 at 610.

The protocol conversion controller 314 activates the FEC protocol receiver 316 at 612 and activates the ARQ protocol receiver 320 at 611 simultaneously. In communications between the ARQ protocol receiver 320 and the protocol converter in the mobile station 207, the transmission of an ARQ synchronizing signal from the protocol converter in the mobile station 207 is recognized as the establishment of ARQ protocol receiving synchronization at 613 by the ARQ protocol receiver 320. Upon establishment of ARQ protocol receiving synchronization at 613, the ARQ protocol receiver 320 activates the ARQ protocol transmitter 321 at 614, and then ARQ protocol transmitting synchronization is established at 617. When the protocol conversion controller 314 detects the establishment of ARQ protocol receiving synchronization at 615, the protocol conversion controller 314 deactivates the FEC protocol receiver 316. Now, ARQ protocol transmitting and receiving synchronization in the radio communication zone is established.

After the protocol is established in the radio communication zone according to either of the above transmission control procedures, PSTN protocol transmitting and receiving synchronization is established at the V.42 protocol transmitter 315 and the V.42ANNEX protocol receiver 318 or the V.32 protocol transmitter 319 and the V.32 protocol receiver 322, and modem data communications are carried out.

According to the present invention, as described above, it is possible to carry out modem data communications irrespective of whether the protocol converter in the mobile station 207 is designed for modem communications at the rate of 2.4 Kbps (FEC protocol) or modem communications at the rate of 9.6 Kbps (ARQ protocol).

Since it is not necessary to add or expand data communication service class information which the mobile telephone set requests the exchange to deliver, the mobile telephone set and the exchange do not need to be modified.

While a preferred embodiment of the present invention has been described using specific terms, such description is for illustrative purposes only, and it is to be understood that changes and variations may be made without departing from the spirit or scope of the following claims.

What is claimed is:

1. A digital mobile data communication system comprising:

a mobile system comprising a digital mobile telephone set and a protocol converter in a mobile station; and a protocol converter in an exchange comprising an FEC protocol receiver and an FEC protocol transmitter in a radio communication zone for modem communications at a rate of 2.4 Kbps, an ARQ protocol receiver and an ARQ protocol transmitter in a radio communication zone for modem communications at a rate of 9.6 Kbps, and means, responsive to a modem communication service request from said mobile system, for simultaneously activating said FEC protocol receiver and said ARQ protocol receiver and selecting whichever one of said FEC protocol receiver or said ARQ protocol receiver that has established receiving synchronization and selecting the corresponding FEC protocol transmitter or ARQ protocol transmitter.

2. A digital mobile data communication system comprising:

a data terminal, a modem, and an exchange which are connected to a public network;

a mobile system comprising a digital mobile telephone set and a protocol converter in a mobile station, for carrying out modem communications with said data terminal through said modem in a radio communication zone; and a protocol converter in an exchange comprising a V.42ANNEX protocol transmitter, a V.42ANNEX protocol receiver, an FEC protocol transmitter, and an FEC protocol receiver for modem communications at a rate of 2.4 Kbps, a V.32 protocol transmitter, a V.32 protocol receiver, an ARQ protocol transmitter, and an ARQ protocol receiver for modem communications at a rate of 9.6 Kbps, and a protocol conversion controller for receiving a modem activation command from said exchange in response to a modem communication service request from said digital mobile telephone set;

wherein when said protocol conversion controller receives said modem communication service request, said protocol conversion controller activates said FEC protocol receiver and said ARQ protocol receiver simultaneously, and wherein when FEC protocol receiving synchronization with said protocol converter in the mobile station is established, said FEC protocol receiver activates said FEC protocol transmitter and said protocol conversion controller deactivates said ARQ protocol receiver, and when ARQ protocol receiving synchronization with said protocol converter in the mobile station is established, said ARQ protocol receiver activates said ARQ protocol transmitter and said protocol conversion controller deactivates said FEC protocol receiver to establish protocol transmitting and receiving synchronization in said radio communication zone, and thereafter protocol transmitting and receiving synchronization in said public network between said V.42ANNEX protocol transmitter and said V.42ANNEX protocol receiver or said V.32 protocol transmitter and said V.32 protocol receiver is established for modem communications.

3. The system of claim 1, further comprising means for deactivating whichever one of said FEC protocol receiver or said ARQ protocol receiver that has not established synchronization with said modem communication service request.

* * * * *